(12) United States Patent
Streebin (10) Patent No.: US 11,354,620 B2
(45) Date of Patent: Jun. 7, 2022

(54) SYSTEM AND METHODS FOR ENABLING EFFICIENT SHIPPING AND DELIVERY

(71) Applicant: Simpler Postage, Inc., San Francisco, CA (US)

(72) Inventor: Jarrett Streebin, San Francisco, CA (US)

(73) Assignee: Simpler Postage, Inc., San Francisco, CA (US)

( * ) Notice: Subject to any disclaimer, the term of this patent is extended or adjusted under 35 U.S.C. 154(b) by 172 days.

(21) Appl. No.: 16/857,066

(22) Filed: Apr. 23, 2020

(65) Prior Publication Data

US 2020/0250616 A1    Aug. 6, 2020

Related U.S. Application Data

(63) Continuation of application No. 14/481,078, filed on Sep. 9, 2014, now Pat. No. 10,671,966.

(60) Provisional application No. 61/879,608, filed on Sep. 18, 2013.

(51) Int. Cl.
*G06Q 10/08*    (2012.01)
*G06Q 40/08*    (2012.01)

(52) U.S. Cl.
CPC ....... *G06Q 10/08345* (2013.01); *G06Q 40/08* (2013.01)

(58) Field of Classification Search
None
See application file for complete search history.

(56) References Cited

U.S. PATENT DOCUMENTS

| | | |
|---|---|---|
| 6,772,130 B1 | 8/2004 | Karbowski et al. |
| 6,970,855 B2 | 11/2005 | Das et al. |
| 7,411,501 B2 | 8/2008 | Austin |
| 7,483,857 B2 | 1/2009 | Bansal et al. |
| 7,844,553 B2 | 11/2010 | Whitehouse |
| 8,131,654 B2 | 3/2012 | Asano et al. |
| 8,150,181 B2 | 4/2012 | Bruna et al. |
| 8,150,781 B2 | 4/2012 | Mccall et al. |
| 8,156,052 B1 | 4/2012 | Lundberg et al. |
| 8,306,837 B2 | 11/2012 | Eager |
| 8,311,880 B1 | 11/2012 | Zabriskie et al. |
| 8,334,773 B2 | 12/2012 | Cova et al. |
| 8,429,019 B1 | 4/2013 | Yeatts et al. |
| 8,600,913 B2 * | 12/2013 | Williams ............ G06Q 10/0837 705/340 |
| 9,047,607 B1 | 6/2015 | Curial et al. |
| 9,269,065 B2 | 2/2016 | Erie et al. |

(Continued)

OTHER PUBLICATIONS

Davis, Tony, "What is a WebHook?", webhooks.pbworks.com, https://webhooks.pbworks.com/w/page/13385124/Frontpage, retrieved Mar. 28, 2017, published Jun. 5, 2011.

(Continued)

*Primary Examiner* — Paul Danneman
(74) *Attorney, Agent, or Firm* — Jeffrey Schox; Diana Lin (57) ABSTRACT

A method for recipient-initiated shipping includes receiving, at an internet connected server, recipient data (including a first shipping address) from a shipping recipient; providing delivery options to the shipping recipient based on a set of delivery option criteria and the recipient data; receiving a delivery choice from the shipping recipient; and notifying at least one of a shipping sender and a shipping carrier of the delivery choice.

20 Claims, 5 Drawing Sheets

(56) References Cited

U.S. PATENT DOCUMENTS

| | | |
|---|---|---|
| 9,307,383 B1 | 4/2016 | Patrick |
| 9,697,548 B1 * | 7/2017 | Jaff .................... G06Q 30/0601 |
| 10,198,707 B1 | 2/2019 | Bolton et al. |
| 10,824,982 B1 | 11/2020 | Whitehouse et al. |
| 2002/0107785 A1 | 8/2002 | Melchior et al. |
| 2003/0144971 A1 | 7/2003 | Das et al. |
| 2003/0200111 A1 | 10/2003 | Damji |
| 2005/0251330 A1 | 11/2005 | Waterhouse et al. |
| 2006/0015469 A1 | 1/2006 | Whitehouse |
| 2006/0041481 A1 | 2/2006 | Stowe |
| 2006/0202009 A1 | 9/2006 | Austin |
| 2006/0224398 A1 | 10/2006 | Lakshman et al. |
| 2008/0109246 A1 | 5/2008 | Russell |
| 2010/0153309 A1 | 6/2010 | Asano et al. |
| 2010/0185476 A1 | 7/2010 | Eager |
| 2011/0050423 A1 | 3/2011 | Cova et al. |
| 2011/0071954 A1 | 3/2011 | Mccall et al. |
| 2011/0153513 A1 | 6/2011 | Erie et al. |
| 2012/0173450 A1 | 7/2012 | Mccall et al. |
| 2013/0262274 A1 | 10/2013 | Hariharan et al. |
| 2014/0122227 A1 | 5/2014 | Reinshagen |
| 2014/0330741 A1 | 11/2014 | Bialynicka-Birula et al. |
| 2015/0193857 A1 | 7/2015 | Reed et al. |

OTHER PUBLICATIONS

Shippo Engineering , "Webhooks, Shipping and Event Notification", Shippo, https://goshippo.com/blog/webhooks-shipping-and-event-notifications/, retrieved Feb. 11, 2022, published Jun. 7, 2016 (Year 2016).

* cited by examiner

SYSTEM AND METHODS FOR ENABLING EFFICIENT SHIPPING AND DELIVERY

CROSS-REFERENCE TO RELATED APPLICATIONS

This application is a continuation of U.S. patent application Ser. No. 14/481,078, filed 9 Sep. 2014, which claims the benefit of U.S. Provisional Application Ser. No. 61/879,608, filed on 18 Sep. 2013, which are incorporated in their entirety by this reference.

TECHNICAL FIELD

This invention relates generally to the shipping services field, and more specifically to a new and useful system and methods for enabling efficient shipping and delivery in the shipping services field.

BACKGROUND

The shipping services field is incredibly important to people and businesses across the world. Providing efficient shipping and delivery services is a challenging task with many facets. While the shipping services field has grown and matured over the years, delivery and shipping inefficiencies still cause substantial problems for shipping senders, shipping recipients, and shipping carriers alike. Thus, there is a need in the field of shipping services to create a new and useful system and methods to address delivery and shipping inefficiencies. This invention provides such a new and useful system and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. A System for Enabling Efficient Shipping and Delivery

Figure 1:
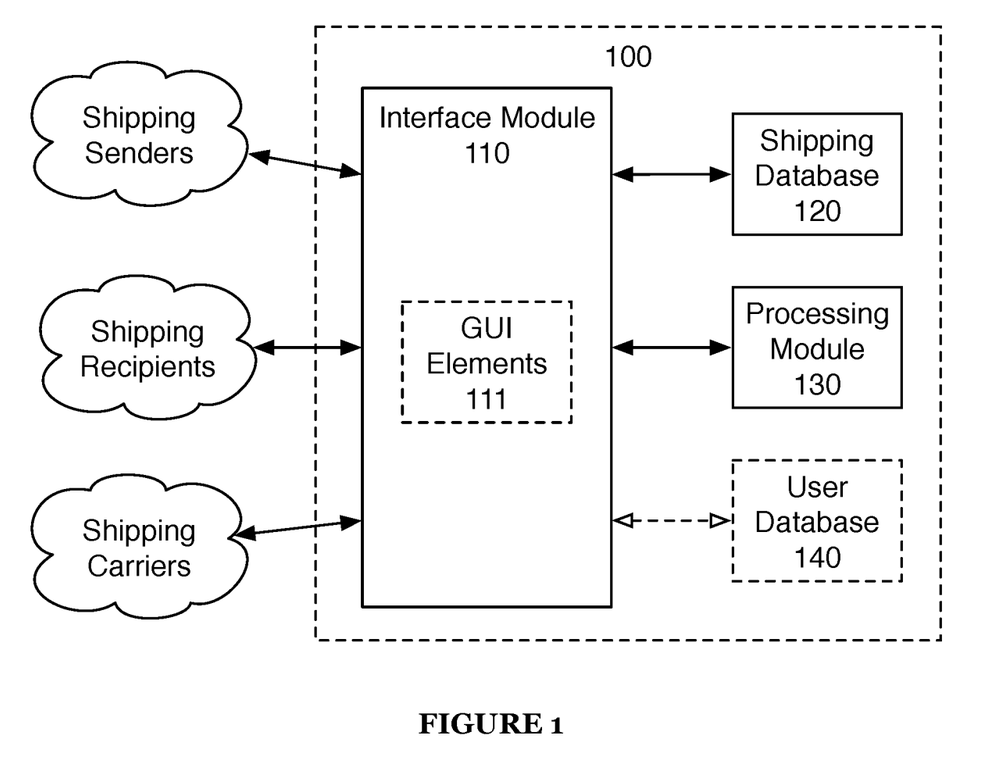
FIG. 1 is a diagram representation of a system of a preferred embodiment.

As shown in FIG. 1, a system 100 for enabling efficient shipping and delivery may include an interface module 110 that facilitates communication between shipping senders, shipping recipients, and shipping carriers; a shipping database 120 that stores shipping information; and a processing module 130 that responds to requests from the interface module 110, processes data in the shipping database 120, and outputs processed data to the interface module 110.

The system 100 preferably enables more efficient and reliable delivery by providing shipping senders and shipping recipients with processed data based on data in the shipping database 120 and by allowing shipping senders and shipping recipients more choice in shipping options based on the processed data. This can enable more efficient (e.g., faster or less expensive) delivery as well as more reliable (e.g., more likely to result in success of delivery) delivery.

The interface module 110 preferably functions to facilitate communication between shipping senders (e.g., Macy's), shipping recipients (e.g., a Macy's customer), and shipping carriers (e.g., FedEx). Shipping senders preferably include parties who possess or have access to goods, and desire to ship such goods to a shipping recipient. Shipping recipients preferably include parties who receive goods shipped at the request (implicit or otherwise) of shipping senders. Shipping carriers preferably include parties who transport shipped goods from one location for another. The interface module 110 preferably communicates directly with shipping senders, shipping recipients, and shipping carriers; but alternatively may only communicate directly with one or two of those three parties. For example, the interface module 110 may receive all data required for shipping from the shipping sender, negating the need to communicate directly with the shipping recipient. The interface module 110 preferably includes an application programming interface (API), but may alternatively include any interface that enables communication between shipping senders, shipping recipients, and shipping carriers. The API is preferably implemented using RESTful JSON but may alternatively be implemented in any other suitable manner. The interface module 110 is preferably located in remote servers that are part of a shipping services platform (e.g., Easypost), but may alternatively be located in the cloud or in local servers. The interface module 110 preferably is connected to the shipping database 120 and the processing module 130. The interface module 110 preferably receives and responds to requests from shipping senders. The requests are preferably communicated through an API but may additionally or alternatively be communicated, at least in part, through a graphical user interface. Allowable requests preferably include shipping price quote requests, address verification requests, shipping purchase requests, return requests, and shipping tracking requests; but alternatively may include any set of requests relevant to shipping services. Additional requests that may be allowable include insurance quote requests, delivery time estimate requests, shipment re-routing requests, historical data requests (e.g., requests for delivery success rate associated with a particular zip code). Responses preferably include responding to an allowable request in an appropriate manner (e.g., providing a price quote upon request). The interface module 110 preferably receives and responds to requests from shipping recipients. For example, a shipping recipient may request and receive tracking data for a shipment. The interface module 110 preferably receives and responds to these requests through the API, but may alternatively receive and respond to these requests in any other suitable manner. The interface module 110 preferably sends requests from any party to the processing database 130, where the requests are processed and returned to the interface module 110 before the interface module 110 responds, but may alternatively process requests and respond directly. The interface module 110 preferably performs automated notification tasks, for example, sending out package tracking notifications or failed delivery notifications.

The shipping database 120 preferably functions to store shipping information. The shipping database 120 preferably includes address information, shipping route information, and statistical information; but may alternatively include any information relevant to shipping. Address information preferably includes addresses, the number of successful deliveries to each address, additional information about the address (for example, instructions about where packages should be left for large premises), information on whether the address has been verified by any shipping carrier, or any other information linked to addresses. Shipping route information preferably includes the probable route taken by delivery drivers to deliver items to particular areas or addresses, the times of day that deliveries occur, how long delivery from a shipping center or location to a particular area or address takes, typical traffic patterns, real-time traffic patterns, and/or any other information linked to shipping routes. Statistical information preferably includes demographics of an area, theft statistics of an area, or other statistical factors that may affect shipping. The shipping database 120 is preferably located in remote servers that are part of a shipping services platform (e.g., Easypost), but may alternatively be located in the cloud or in local servers. The shipping database 120 preferably is accessed by the processing module 130, but alternatively may be accessed by any other component of the system 100. The shipping database 120 preferably receives shipping information from the interface module 110, but may also receive shipping information from other sources. For example, the shipping database 120 may be populated with data from an external shipper. The shipping database 120 preferably stores shipping data from each shipment processed through the system 100, but may alternatively only store shipping data from particular shipments.

The processing module 130 preferably functions to process data in the shipping database 120 and output processed data to the interface module 110. The processing module 130 also preferably functions to process and respond to requests sent from the interface module 110 to the processing module 1300. The processing module 130 is preferably connected to both the interface module 110 and the shipping database 120. The processing module 130 preferably processes address verification requests, shipping price quote and purchase requests, insurance requests, and tracking requests. The processing module 130 may additionally or alternatively process delivery time estimate requests, shipment re-routing requests, and/or historical data requests.

The processing module 130 preferably processes address verification requests by receiving an address from the interface module 110, checking that address against the shipping database 120, and returning the results of address verification (e.g., whether the address is verified and by whom) to the interface module 110. If the address is in the shipping database 120, the processing module 130 may return data on shipments sent to the address along with verification data. The processing module 130 may alternatively check the address using external address verification tools (e.g., the USPS address verification tool). The processing module 130 may additionally or alternatively process address verification requests by assigning an address verification score to an address (e.g., a number from 1-10 that represents confidence in a given address). The processing module 130 may also additionally suggest alternative addresses; for example, if an address is unverified but very similar to another address, the other address may be a suggested alternative. As another example, if an address has a low verification score but the address is associated with a person who is also associated with another address having a high verification score, the other address may be a suggested alternative.

The processing module 130 preferably processes shipping price quote requests by receiving origination and destination addresses and information about the package to be shipped (e.g., package size and shape) from the interface module 110, generating quotes based on this information either using an internal pricing database, equation or external tools (e.g., the FedEx pricing API), and returning these quotes to the interface module 110. The quotes preferably include quotes from more than one shipping carrier. Along with the quotes, the processing module 130 may include address verification results for the destination. The processing module 130 may also include shipping scores for each carrier option; these shipping scores could be based on number of successful past deliveries to the area or the address, the speed with which deliveries typically occur to the area or the address, the number of thefts for that particular carrier option in the area or at the address, customer satisfaction with the particular carrier option in the area, or any other suitable data. The shipping scores are preferably based on data from the shipping database 120, but may alternatively be based on data from any suitable source (e.g., external databases). The processing module 130 preferably suggests price alterations (e.g., to shipping senders) based on the shipping scores or other suitable information. For example, the processing module 130 may suggest offering a discount if a shipping score is particularly good (e.g., beyond a first score threshold), or adding an additional handling fee or insurance fee if a shipping score is particularly bad (e.g., below a second score threshold). The processing module 130 preferably processes shipping purchase requests by generating a quote if a specific carrier option is not specified in the request. After a specific carrier option is specified, the processing module 130 preferably prepares a purchase order that is returned to the interface module 110 to be sent to a shipping carrier. The processing module 130 also preferably prepares a confirmation that is returned to the interface module 110 to be sent to a shipping sender and/or a shipping recipient.

In a variation of a preferred embodiment, the processing module 130 generates both internal and external quotes. Internal quotes preferably represent shipment costs (e.g., cost paid to shipping carrier) while external quotes represent cost to a shipping sender and/or shipping recipient. Internal quotes, along with shipping risk or other criteria (e.g., how likely it is for a package to be stolen, damaged, or lost) are preferably used to determine external quote cost, but may additionally or alternatively be used to determine which shipment options are made available to shipping senders/recipients, or for any other suitable purpose. In a first example, a first shipment type results in an internal quote of $5.00, but the shipment type is high risk, so the external quote for this shipment type is $6.00 (while a typical risk quote might result in a $5.50 external quote). In a second example, the first shipment type is again high risk and associated with a $5.00 internal quote; the external quote is $5.50, but a lower risk shipment type (associated with a $6.00 internal quote) is offered with an external quote at $5.25; in other words, a more expensive shipment type is discounted to account for a reduction in shipping risk. External quotes may be generated based on a number of factors, including shipping history (e.g., high-volume clients may receive lower external quote prices for a given internal quote), shipping risk, insurance costs, and any other suitable factors.

The processing module 130 preferably processes insurance requests by receiving shipment data relevant to insurance (e.g., destination and origin addresses, package content and value) from the interface module 110 and computing an insurance score from the shipment data and from data in the shipping database 120 (e.g., theft data, demographic data). For example, the processing module 130 may compute an insurance score based on how often packages are successfully delivered to a particular zip code (i.e., local delivery success rates). Alternatively, the processing module 130 may compute the insurance score using external data sources (e.g., actuarial tables, other crime statistics, etc.). After computing the insurance score, the processing module 130 preferably returns the score to the interface module 110, where the score may be sent directly to the request originator or to an external site to get an insurance quote. If the score is sent to an external site, the interface module 110 receives the quote produced by the external site and sends the received quote to the request originator. Alternatively, the processing module 130 may directly calculate an insurance quote based on internal rules or by consulting an external database. Insurance may be offered on a per-shipment basis, on a per-shipper basis (e.g., a policy covers multiple shipments from one shipper), a per-recipient basis (e.g., a policy that covers returns to a large store), or any other suitable basis.

The processing module 130 preferably processes return requests by receiving return requests from the interface module 110, offering return method choices, and processing the return after receiving a selection of the return method choices. The return requests may be initiated through a user account, a shipping platform tracking link, or any other suitable method. Return requests may be initiated, for example, by selecting a product from a list of recently received products to return, or by sending a picture of the product or barcode that the recipient desires to return. The recipient is preferably offered a list of return methods (which may include drop-off locations and times or other data relevant to returning), but may additionally or alternatively be given a single return method. Once the return method has been selected by the recipient, the return is preferably processed by the shipping services platform. In one example, the shipping services platform provides the recipient with a printable label, and notifies both the associated shipping carrier and shipping sender to expect a return. Note that in some cases, return requests may be processed without first contacting the original shipping sender.

For items originally sent along with other items, return requests preferably indicate which items are being returned for smart packaging purposes. For example, if a balsa-wood model plane is shipped along with a bowling ball, and the user desires to return only the plane, the return will be processed for only the dimensions and weight of the plane (and not the weight and dimensions of the combined shipment, including the bowling ball).

The processing module 130 preferably processes tracking requests by receiving tracking requests from the interface module 110, receiving tracking data from the shipping carrier of the tracking request, processing that data into an accessible format, and returning the data to the interface module 110. The processing module 130 may also include tracking estimates with the data; the tracking estimates are preferably based on data contained in the shipping database 120. For example, the processing module 130 may return information from the shipping carrier stating that the shipment is due to arrive on a Wednesday, and also return information from the shipping database 120 that shipments sent to that area on Wednesdays are likely to arrive around 4-5 PM. The processing module 130 is preferably located in remote servers that are part of a shipping services platform (e.g., Easypost), but may alternatively be located in the cloud or in local servers.

Figure 3A:
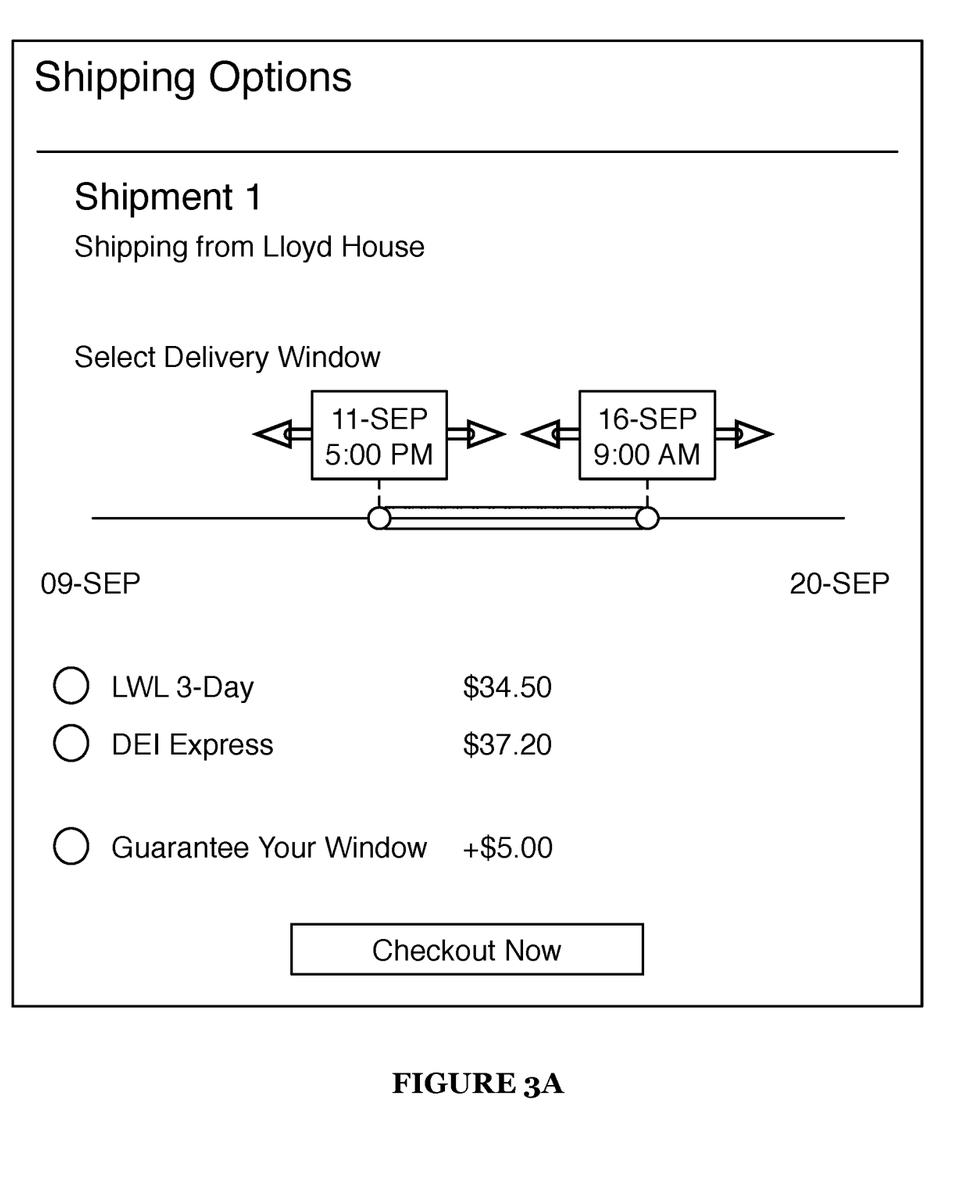
FIGS. 3A and 3B are diagram representations of a variation of a method enabling efficient recipient-initiated shipping and delivery of a preferred embodiment.
Figure 3B:
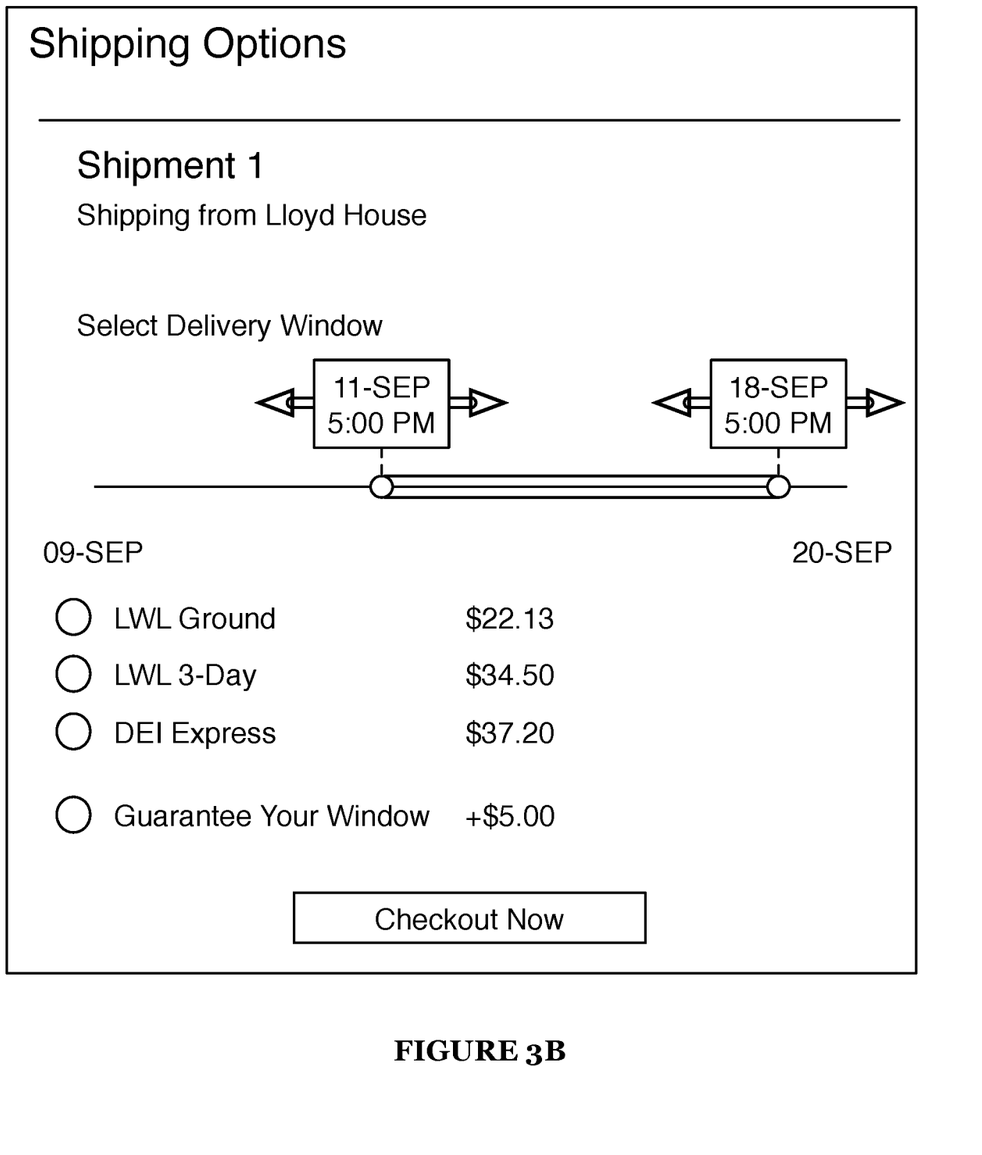

In one embodiment, the interface module 110 includes GUI elements 111. The GUI elements 111 preferably function to allow shipping senders and recipients to view processed data or scores. The GUI elements 111 are preferably implemented as part of requests to the interface module 110 (for example, a website could initiate a request to display shipping scores, and the interface module 110 would return a graphic displaying shipping scores), but may alternatively be part of a direct interface to a shipping services platform. The GUI elements 111 may include slider interfaces coupled to algorithms of the processing module 130. For example, the GUI elements 111 may include a slider that lets users select different shipping methods based on delivery time windows, as shown in FIGS. 3A and 3B. In this example, the GUI elements 111 include a set of sliders along a horizontal axis (where the horizontal axis represents time); recipients move sliders appropriately to set the delivery window, and afterwards select from available delivery options-changing the sliders may change the available delivery options or their prices. Additionally or alternatively, the GUI elements 111 may be implemented using any other suitable delivery window selection mechanisms; for example, users may enter delivery window parameters manually, or may select delivery window blocks on a calendar or schedule.

While the interface as shown in FIG. 3A and FIG. 3B includes a single delivery window, the GUI elements 111 may include sliders or other mechanisms to allow shipping recipients to set multiple delivery windows (for example, weekdays between 5 and 8 PM).

In one embodiment, the system 100 also includes a user database 140. The user database 140 preferably functions to store information about users to enable more efficient delivery. The user database 140 preferably stores a user profile containing address information that can be accessed with a login or key. For example, a customer purchasing an item from a store website would be able to send login information to the system 100 to have information from the user database 140 automatically fill out shipping information fields in the store website checkout form. Users with existing store logins (e.g., an account for purchasing from a department store) are preferably able to link store logins to the user database 1400. In some cases, it may be possible to import order histories or other information from existing store logins. Alternatively, the customer may be directed to an external webpage connected to the system 100 where they can complete the transaction. The user database 140 may also store additional information including additional delivery instructions for each address, preferred contact information, and preferred delivery times. The user database 140 can additionally store a user profile, user payment options or information, or any other suitable user data. The user database 140 is preferably accessible through the interface module 110, but may alternatively be accessed using any other suitable method. The processing module 130 preferably uses information from the user database 140 to generate shipping quotes; for example, the processing module 130 may produce shipping quotes or scores for multiple addresses contained within the user database 140 so that a shipping recipient or sender can pick an ideal address for shipping. The user database 140 preferably contains data limited to a user and authorized sources (e.g., addresses, which are preferably limited to the user and any sources authorized by the user) but may alternatively also contain public data; for example, ratings of shipping carriers. Ratings input by users are preferably stored and used in calculating shipping scores. Ratings may alternatively be used to help shipping senders or recipients choose a shipping carrier. Ratings can additionally be used to adjust the information within the shipping database, such as address information or theft statistics. The user database 140 may be used by the processing module 130 in calculating insurance quotes (for example, users who are less likely to claim insurance may receive lower insurance prices). The user database 140 is preferably located in remote servers that are part of a shipping services platform (e.g., Easypost), but may alternatively be located in the cloud or in local servers.

2. A Method for Enabling Efficient Recipient-Initiated Shipping and Delivery

Figure 2:
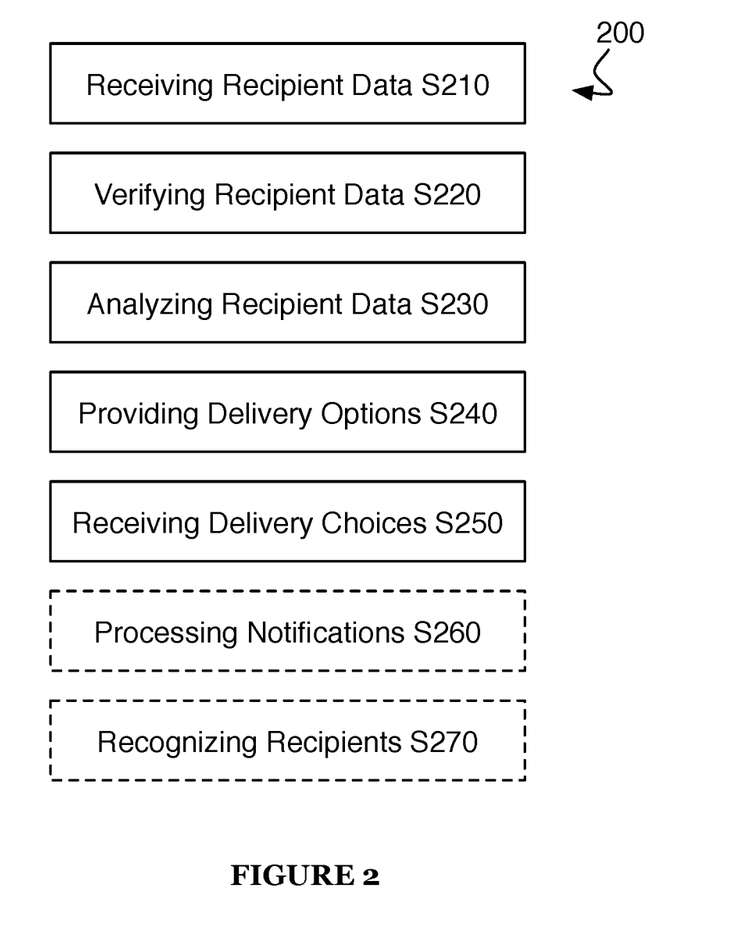
FIG. 2 is a diagram representation of a method enabling efficient recipient-initiated shipping and delivery of a preferred embodiment.

As shown in FIG. 2, a method 200 for enabling efficient recipient-initiated shipping and delivery may include receiving recipient data from a shipping recipient S210, verifying the recipient data S220, analyzing the recipient data S230, providing delivery options to the shipping recipient S240, and receiving delivery option choices from the shipping recipient S250. The method functions to enable efficient delivery and shipping by increasing both knowledge of and control over the shipping and delivery process for both shipping recipients and shipping senders. The method is preferably implemented by a system substantially similar to the one above, but may alternatively be implemented by any suitable system.

Step S210, which includes receiving recipient data from a shipping recipient, functions to obtain data relevant to shipping from a shipping recipient. The receiving recipient data preferably occurs through an application programming interface (API) accessed by a shipping sender's app or website, but may alternatively occur in any other suitable way. The API preferably is located on a remote server that is part of a shipping services platform, but may alternatively be located in the cloud, on local servers, or in any other suitable location. The shipping services platform preferably acts as an interface between the shipping sender, shipping recipient, and shipping carrier; i.e., communication between the three parties is mediated by the shipping services platform. Alternatively, the shipping services platform may only mediate some communication between the three parties. The shipping service platform can function to provide a normalized interface between the three parties, such that interacting with a first shipping carrier is a substantially similar interaction as interacting with a second shipping carrier. The recipient data is preferably stored on a server for later verification, preparing shipping labels, or any other suitable use. Recipient data preferably includes the recipient address, but may also include other information relevant to shipping such as delivery instructions. Delivery instructions may include times for delivery, gate or access codes, further location information, preferred carrier, or any other instructions for delivery. Recipient data may additionally or alternatively include scheduling data (e.g., data specifying that a certain delivery address be used for deliveries estimated to arrive in a certain time window). In one example, a customer enters an address into a form on a store website; the address is sent through an API to be verified. In a second example, a customer calls a store and gives an address over the phone; an employee of the store enters the address into a computer. In both of these examples, the recipient data is manually entered, but recipient data may also be entered automatically. For example, the recipient data might be automatically filled in by a store website for a customer with an account with the store.

Step S220, which includes verifying the recipient data, functions to confirm the validity of recipient data. Step S220 can reduce the likelihood of incorrect recipient data being entered. Recipient data is preferably verified by receiving an address, checking that address against a shipping database, and returning the results of the address verification (e.g., whether the address is verified and by whom). Recipient data may alternatively be verified using external address verification tools (e.g., the USPS address verification tool) or by other methods (e.g., checking to make sure the city field of an address does not contain numbers, looking for spelling errors, or making sure required fields are filled out). If the address is in the shipping database, data on shipments sent to the address or to the area the address is in is preferably returned with verification results. If the address is not in the shipping database, the address is preferably verified using alternative means (such as those mentioned above). Any external data collected as part of the verification process is preferably stored in the shipping database for later use. Step S220 may additionally or alternatively include verifying recipient data by assigning an address verification score to an address (e.g., a number from 1-10 that represents confidence in a given address). Step S220 may additionally include suggesting alternative addresses; for example, if an address is unverified but very similar to another address, the other address may be a suggested alternative. As another example, if an address has a low verification score but the address is associated with a person who is also associated with another address having a high verification score, the other address may be a suggested alternative.

Step S230, which includes analyzing the recipient data, functions to perform analysis on the recipient data to be used in determining delivery options for the shipping sender and recipient. Analyzing the recipient data preferably includes calculating shipping scores for each address in the recipient data. Shipping scores are preferably based on factors including number of successful past deliveries to the area or the address, the speed with which deliveries typically occur to the area or the address, the number of thefts for that particular carrier option in the area or at the address, customer satisfaction with the particular carrier option in the area, or any other suitable data. Shipping scores preferably function to predict the projected speed and level of success of a delivery. Shipping scores are preferably calculated for both shipping addresses and billing addresses; this allows a billing address to be presented as an option for shipping. Shipping scores may additionally or alternatively be calculated for any other suitable addresses; for example, shipping scores may be calculated for local delivery pickup nodes, such as package lockers at a convenience store. Shipping scores are preferably calculated independent of carrier choice or shipment type (e.g., ground, airmail) choice, but may additionally or alternatively be calculated taking into account carrier choice and/or shipment type choice. If shipping scores take into account carrier choice and/or shipment type choice, multiple shipping scores may be calculated (e.g., one for each carrier choice). Analyzing the recipient data may also include calculating insurance scores. Insurance scores are preferably determined based on shipment data relevant to insurance (e.g., destination and origin addresses, package content and value) and from data in the shipping database (e.g., theft data, demographic data). For example, an insurance score may be computed based on how often packages are successfully delivered to a particular zip code. Alternatively, the insurance score may be computed using external data sources (e.g., actuarial tables, other crime statistics, etc.). After computing the insurance score, the score may be sent to shipping sender, to an external insurance broker, or it may be kept for internal use. If the insurance score is kept for internal use, it may be used to directly calculate an insurance quote based on internal rules or by consulting an external database. Alternatively, the processing module 130 may compute the insurance score using external data sources (e.g., actuarial tables, other crime statistics, etc.). After computing the insurance score, the processing module 130 preferably returns the score to the interface module 110, where the score may be sent directly to the request originator or to an external site to get an insurance quote. If the score is sent to an external site, the interface module 110 receives the quote produced by the external site and sends the received quote to the request originator. Insurance may be offered on a per-shipment basis, on a per-shipper basis (e.g., a policy covers multiple shipments from one shipper), a per-recipient basis (e.g., a policy that covers returns to a large store), or any other suitable basis.

Step S240, which includes providing delivery options to the shipping recipient, preferably functions to provide shipping recipients with delivery options. Delivery options may include choice of shipping carrier, choice of shipment type (e.g., ground or airmail), choice of address (if multiple addresses have been received), insurance options, preferred time of delivery, price quote, or any other options relevant to delivery. Delivery options are preferably provided based on criteria set by the shipping sender, but alternatively may be provided according to a default criteria set provided by the shipping services platform or any other suitable source. The shipping sender preferably sets the delivery option criteria through a combination of manual selection and automatic selection. Manual selection enables the shipping sender to manually choose options (typically on a case-by-case or batch-by-batch basis) available to shipping recipients. Manual selection preferably includes sending the shipping sender recipient data analysis (for example, shipping scores) and then receiving a selection of delivery options to be made available to the shipping recipient. This manual selection is preferably automated by the shipping sender (e.g., the shipping sender writes their own program to make selections from recipient data) but alternatively may be accomplished by any other means. Automatic selection enables delivery options to be selected without direct communication with the shipping sender. Automatic selection may be specified explicitly or implicitly. Automatic selection specified explicitly preferably includes specifying particular delivery options based on recipient data; e.g., specifying that UPS Ground is the only shipping option for deliveries to zip code 94401. Automatic selection specified explicitly may alternatively be based on other input data or on static rules; e.g., simply specifying that UPS ground is the only shipping option. Automatic selection specified implicitly preferably includes allowing the shipping services platform to specify delivery options based on recipient data, other data, or static rules. For example, the shipping sender may specify that the three least expensive types of shipping service should be made available to the customer. As another example, the shipping sender may specify that only carriers with a delivery success rate above 95% or with a shipping score of 80 or higher be made available to the customer. As a third example, the shipping sender may specify that only shipping addresses with theft rates below 10% may be made available to the customer. Delivery options are preferably modified in availability (i.e. made available or not) but may alternatively also be modified in price or in any other suitable manner. For example, the shipping sender may specify (either manually or automatically) that delivery options with high shipping scores be priced lower than delivery options with low shipping scores. The shipping sender may also specify that a fee be added to delivery options with low shipping scores. As another example, if multiple addresses are made available, the shipping sender may offer a discount to the shipping recipient for using one address over another. The delivery options are preferably chosen using data from the shipping recipient, but may alternatively also be chosen using data from other sources. For example, if a billing address is different than the shipping addresses, the billing address would be offered as a delivery option. As another example, an additional address may be offered if it is linked to a shipping address from the shipping recipient. The linking preferably occurs in a shipping database of the shipping services platform but may alternatively occur in any other manner. Delivery options are preferably provided to shipping recipients with data about the delivery options. Delivery option data preferably includes name of the carrier and type of service, but may alternatively also include other data about the delivery options (e.g., estimated shipping speed, delivery success rate, shipping score, etc.). This data is preferably determined based on data from a shipping services platform shipping database, but may alternatively be determined based on external data. As an example shipping speed may be estimated with higher accuracy than shipping carrier estimates by using data from the shipping database for past deliveries. Delivery option data may be presented with suggestions to a shipping recipient; for example, a recipient whose recipient data contains only addresses with low delivery scores may be suggested to add another address. This recipient may also be offered a discount or reward for adding another address.

In a variation of a preferred embodiment, Step S240 includes generating both internal and external quotes. Internal quotes preferably represent shipment costs (e.g., cost paid to shipping carrier) while external quotes represent cost to a shipping sender and/or shipping recipient. Internal quotes, along with shipping risk or other criteria (e.g., how likely it is for a package to be stolen, damaged, or lost) are preferably used to determine external quote cost, but may additionally or alternatively be used to determine which shipment options are made available to shipping senders/recipients, or for any other suitable purpose. In a first example, a first shipment type results in an internal quote of $5.00, but the shipment type is high risk, so the external quote for this shipment type is $6.00 (while a typical risk quote might result in a $5.50 external quote). In a second example, the first shipment type is again high risk and associated with a $5.00 internal quote; the external quote is $5.50, but a lower risk shipment type (associated with a $6.00 internal quote) is offered with an external quote at $5.25; in other words, a more expensive shipment type is discounted to account for a reduction in shipping risk. External quotes may be generated based on a number of factors, including shipping history (e.g., high-volume clients may receive lower external quote prices for a given internal quote), shipping risk, insurance costs, and any other suitable factors.

In a variation of a preferred embodiment, Step S240 includes providing recipients with a graphical interface that allows the shipping recipient to dynamically set a delivery window, as shown in FIGS. 3A and 3B.

In this variation, Step S240 allows shipping recipients or other parties to change delivery windows (e.g., earliest delivery date and latest delivery date, delivery window duration) and receive updated carrier/shipment type options along with corresponding prices. For example, a recipient might increase a delivery window size to get lower-priced options (as shown in FIG. 3B).

The graphical interface is preferably implemented using a series of sliders along a horizontal axis (where the horizontal axis represents time); recipients move sliders appropriately to set the delivery window, and afterwards select from available delivery options-changing the sliders may change the available delivery options or their prices. Additionally or alternatively, the graphical interface may be implemented using any other suitable delivery window selection mechanisms; for example, users may enter delivery window parameters manually, or may select delivery window blocks on a calendar or schedule.

While the interface as shown in FIG. 3A and FIG. 3B includes a single delivery window, Step S240 may include allowing shipping recipients to set multiple delivery windows (for example, weekdays between 5 and 8 PM).

The delivery window preferably corresponds to an estimated delivery time. The estimated delivery time may be estimated from carrier estimates, but may additionally or alternatively be estimated from internal estimates or any other suitable source. For example, the estimated delivery time may be based on shipping data held within a shipping platform database, weather data, or any other suitable data.

The interface may additionally or alternatively allow recipients to set price ranges (for example, only displaying options below $50.00). Price ranges may be set using sliders, manual entry, or any other suitable method.

Step S250, which includes receiving delivery option choices from the shipping recipient, preferably functions to determine the preferred delivery options of shipping recipients. Delivery option choices are preferably received through a shipping services platform API, but may also be received in any other suitable manner. Delivery option choices are preferably sent directly to shipping carriers for processing, but may alternatively be sent to the shipping sender for processing. If delivery option choices are sent directly to shipping carriers, payment is preferably handled by the shipping services platform and shipping labels are then sent to the shipping sender. Alternatively, payment to the shipping carriers may occur in any other suitable manner.

In a variation of a preferred embodiment, Step S250 may include printing out a shipping label at a shipping sender (or other location from where goods are to be shipped). In this variation, Step S250 preferably includes sending recipient data along with shipping type data, preferably encoded in a custom format that obviates the need to send entire label graphics. For instance, Step S250 may include sending an address along with a string "USPSR1", which could be recognized by a printer as a United States Postal Service Rate 1 Parcel—and the label could be formatted and printed appropriately given that. Shipping labels could also be printed manually using an API connected to a shipping services platform. Additionally or alternatively, Step S250 may include printed shipping labels (or other relevant labels) by any suitable means.

The method may additionally include processing notifications S260 as shown in FIG. 2. Step S260 preferably functions to monitor notifications from shipping senders, shipping recipients, and shipping carriers, to send notifications based on data from shipping senders, shipping recipients, shipping carriers, and external sources and to handle responses to these notifications. Notifications sent from shipping senders, shipping recipients, and shipping carriers are preferably processed by the shipping services platform. These notifications are preferably logged by the shipping services platform. These notifications are preferably acted upon according to rules set by the shipping services platform, shipping senders, shipping recipients, and shipping carriers. Acting upon these notifications preferably includes forwarding the notifications to appropriate parties; for example, a failed delivery notification from a shipping carrier might be processed by the shipping services platform and forwarded to both the shipping recipient and sender. As another example, tracking updates may be stored in a log accessible to shipping recipients and not forwarded. Sending notifications preferably includes forwarding received notifications as described above, but may alternatively also include sending notifications based on other data. For example, tracking updates from the shipping services platform's estimates (i.e. not from carrier data) may be sent as notifications. Handling responses to notifications is preferably enabled by providing response options with notifications. For example, a failed shipping notification sent to a shipping recipient may include a mechanism to allow the shipping recipient to reschedule the delivery. Alternatively, responses may be chosen automatically by rules set by shipping recipients, shipping senders, and shipping carriers. For example, a shipping recipient may set a rule that if a package scheduled on a weekday is delayed to a weekend, that package should be held for pickup instead of put on a truck for delivery.

The method may additionally include recognizing known shipping recipients S270, as shown in FIG. 2. Step S270 preferably functions to link shipping recipients with data about the shipping recipients to enable easier and/or more accurate delivery. Recognizing known shipping recipients preferably occurs by allowing shipping recipients to log into the shipping services platform, either directly or through an API. Alternatively, recognizing may occur by comparing addresses or names given by a shipping recipient to names or addresses in the shipping database, or through any other appropriate means. Shipping recipients preferably have profiles in a user database that store user preferences. User preferences preferably include delivery options such as addresses, preferred carrier types, preferred delivery times, and instructions for delivery, but may alternatively also include other information relevant to delivery. Shipping recipients preferably set rules in their profiles to determine preferred delivery options. For example, a shipping recipient may set a work address as a preferred address for all deliveries scheduled to occur on weekdays, but set a home address as a preferred address for all deliveries scheduled to occur on weekends. User profiles are preferably used in analyzing the recipient data S230; for example, shipping scores may be calculated for all addresses available in a user profile. User profiles are also preferably used in offering delivery options S240; for example, delivery options for all addresses in a user profile may be offered. User profiles preferably include feedback collection, which functions to collect shipping recipient feedback for shipping events. For example, shipping recipients may rate their delivery experiences; the ratings could then be used in calculating shipping scores or in any other suitable manner.

The above method is preferably implemented by the system 100, but may alternatively be implemented by any other suitable means.

3. A Method for Enabling Efficient Sender-Initiated Shipping and Delivery

Figure 4:
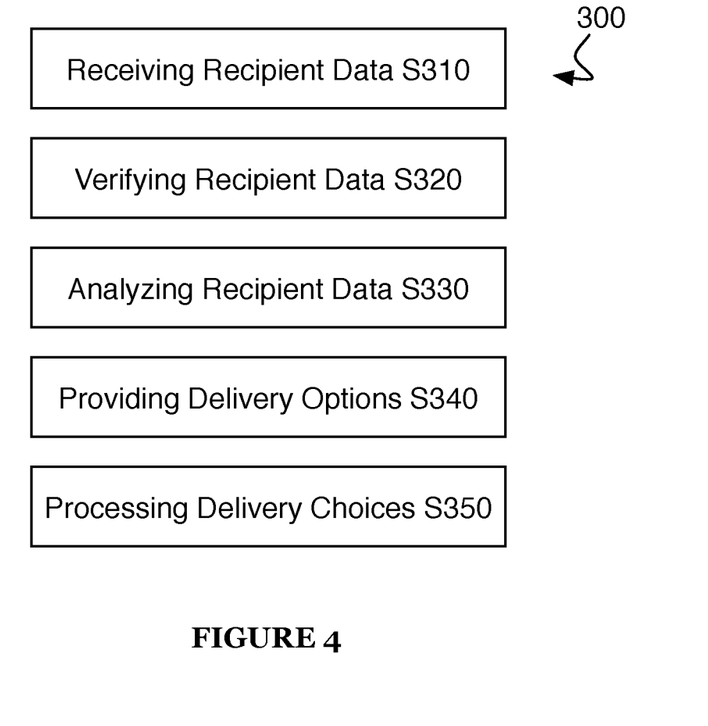
FIG. 4 is a diagram representation of a method for enabling efficient sender-initiated shipping and delivery of a preferred embodiment.

As shown in FIG. 4, a method 300 for enabling efficient sender-initiated shipping and delivery of a preferred embodiment may include receiving recipient data from a shipping sender S310, verifying the recipient data S320, analyzing the recipient data S330, providing delivery options to the shipping sender S340, and processing delivery option choices S350. The method preferably functions to enable efficient delivery and shipping by increasing both knowledge of and control over the shipping and delivery process for shipping senders.

Step S310, which includes receiving recipient data from a shipping sender, functions to obtain data relevant to shipping from a shipping sender. The receiving recipient data preferably occurs through an application programming interface (API) accessed by a shipping sender, but may alternatively occur in any other suitable way. The API preferably is located on a remote server that is part of a shipping services platform, but may alternatively be located in the cloud, on local servers, or in any other suitable location. The shipping services platform preferably acts as an interface between the shipping sender, shipping recipient, and shipping carrier; i.e., communication between the three parties is mediated by the shipping services platform. Alternatively, the shipping services platform may only mediate some communication between the three parties. The recipient data is preferably stored on a server for later verification, preparing shipping labels, or any other suitable use. Recipient data preferably includes the recipient address, but may also include other information relevant to shipping such as delivery instructions. Delivery instructions may include times for delivery, gate or access codes, further location information, or any other instructions for delivery. In one example, a shipping sender enters an address into a form on an internal website; the address is sent through an API to be verified. In this example, the recipient data is manually entered, but recipient data may also be entered automatically. For example, the recipient data might be automatically filled in by a program that automates monthly shipments.

Step S320, which includes verifying the recipient data, functions to confirm the validity of recipient data. Step S320 preferably reduces the likelihood of incorrect recipient data being entered. Recipient data is preferably verified by receiving an address, checking that address against a shipping database of the shipping services platform, and returning the results of the address verification (e.g., whether the address is verified and by whom). Recipient data may alternatively be verified using external address verification tools (e.g., the USPS address verification tool) or by other methods (e.g., checking to make sure the city field of an address does not contain numbers, looking for spelling errors, or making sure required fields are filled out). If the address is in the shipping database, data on shipments sent to the address or to the area the address is in is preferably returned with verification results. If the address is not in the shipping database, the address is preferably verified using alternative means (such as those mentioned above). Any external data collected as part of the verification process is preferably stored in the shipping database for later use. Step S320 may additionally or alternatively include verifying recipient data by assigning an address verification score to an address (e.g., a number from 1-10 that represents confidence in a given address). Step S320 may additionally include verifying alternative addresses; for example, if an address is unverified but very similar to another address, the other address may be linked to the unverified address.

Step S330, which includes analyzing the recipient data, functions to perform analysis on the recipient data to be used in determining delivery options for the shipping sender. Analyzing the recipient data preferably includes calculating shipping scores for each address in the recipient data. Shipping scores are preferably based on factors including number of successful past deliveries to the area or the address, the speed with which deliveries typically occur to the area or the address, the number of thefts for that particular carrier option in the area or at the address, customer satisfaction with the particular carrier option in the area, weather data, or any other suitable data. Shipping scores preferably function to predict the projected speed and level of success of a delivery. Shipping scores are preferably calculated for both shipping addresses and billing addresses; this allows a billing address to be presented as an option for shipping. Shipping scores may additionally or alternatively be calculated for any other suitable addresses; for example, shipping scores may be calculated for local delivery pickup nodes, such as package lockers at a convenience store. Shipping scores are preferably calculated independent of carrier choice or shipment type (e.g., ground, airmail) choice, but may additionally or alternatively be calculated taking into account carrier choice and/or shipment type choice. If shipping scores take into account carrier choice and/or shipment type choice, multiple shipping scores may be calculated (e.g., one for each carrier choice). Analyzing the recipient data may also include calculating insurance scores. Insurance scores are preferably determined based on shipment data relevant to insurance (e.g., destination and origin addresses, package content and value) and from data in the shipping database (e.g., theft data, demographic data). Alternatively, the insurance score may be computed using external data sources. After computing the insurance score, the score may be sent to shipping sender, to an external insurance broker, or it may be kept for internal use. If the insurance score is kept for internal use, it may be used to directly calculate an insurance quote based on internal rules or by consulting an external database.

Step S340, which includes providing delivery options to the shipping sender, preferably functions to provide shipping senders with delivery options. Delivery options may include choice of shipping carrier, choice of type of shipping service (e.g., ground or airmail), choice of address (if multiple addresses have been received), insurance options, preferred time of delivery, or any other options relevant to delivery. Delivery options are preferably provided based on criteria set by the shipping sender, but alternatively may be provided according to a default criteria set provided by the shipping services platform or any other suitable source.

Step S350, which includes processing delivery option choices, functions to set delivery choices based on the shipping senders' selections and to enable delivery based on these choices. The shipping sender preferably selects the delivery choices through a combination of manual selection and automatic selection. Manual selection enables the shipping sender to manually choose choices (typically on a case-by-case or batch-by-batch basis). Manual selection preferably includes sending the shipping sender recipient data analysis (for example, shipping scores) and then receiving delivery choices from the shipping sender. This manual selection is preferably automated by the shipping sender (e.g., the shipping sender writes their own program to make selections from recipient data) but alternatively may be accomplished by any other means. Automatic selection enables delivery choices to be selected without direct communication with the shipping sender. Automatic selection may be specified explicitly or implicitly. Automatic selection specified explicitly preferably includes specifying particular delivery choices based on recipient data; e.g., specifying that deliveries shipped to zip code 94401 are to be shipped via UPS ground. Automatic selection specified explicitly may alternatively be based on other input data or on static rules; e.g., simply specifying that UPS ground is the only shipping option. Automatic selection specified implicitly preferably includes allowing the shipping services platform to specify delivery choices based on recipient data, other data, or static rules. For example, the shipping sender may specify that the least expensive delivery choice always be used. As another example, the shipping sender may specify that carriers with the highest delivery success rates be used. Delivery option data is preferably sent to shipping senders to be used for making shipping option choices. Delivery option data preferably includes name of the carrier and type of service, but may alternatively also include other data about the delivery options (e.g., estimated shipping speed, delivery success rate, shipping score, etc.). This data is preferably determined based on data from a shipping services platform shipping database, but may alternatively be determined based on external data. As an example, shipping speed may be estimated with higher accuracy than shipping carrier estimates by using data from the shipping database for past deliveries. Delivery option data may be presented with suggestions to a shipping sender; for example, a shipping sender may be suggested to change carriers if the chosen carrier has a low average shipping score. Delivery option choices are preferably received by a shipping services platform through a shipping services platform API, but may also be received in any other suitable manner. Delivery option choices are preferably sent directly to shipping carriers for processing. Payment is preferably handled by the shipping services platform and shipping labels are then sent to the shipping sender, but alternatively payment may be handled directly by the shipping sender. Alternatively, payment to the shipping carriers may occur in any other suitable manner.

The above method is preferably implemented by the system 100, but may alternatively be implemented by any other suitable system.

An alternative embodiment preferably implements the above methods in a computer-readable medium storing computer-readable instructions. The instructions are preferably executed by computer-executable components preferably integrated with a shipping services platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

I claim:

1. A method for return shipping comprising: at an internet connected server of a shipping services platform:
   receiving a return request from a user device external to the shipping services platform,
   wherein the server receives the return request via a shipping services platform application programming interface (API),
   wherein the return request identifies at least a return method and a product previously delivered to a delivery address associated with a user of the user device,
   wherein the product is a product previously delivered to the delivery address by using the shipping services platform;
   accessing a printable shipping label for return of the product in accordance with the return request;
   providing the printable shipping label to the user device via the API; and
   providing a notification to a shipping carrier associated with the shipping label, wherein the notification is contemporaneously provided to the shipping carrier when the printable shipping label is provided to the user device.

2. The method of claim 1, wherein the return request identifies a user account associated with the delivery address.

3. The method of claim 1, wherein the return request identifies a shipping services platform tracking link associated with previous delivery of the product to the delivery address.

4. The method of claim 1, wherein the return request includes a picture of the product, and a shipping services platform tracking link associated with previous delivery of the product to the delivery address.

5. The method of claim 1, wherein the return request includes a barcode of the product, and a shipping services platform tracking link associated with previous delivery of the product to the delivery address.

6. The method of claim 1, further comprising: at the internet connected server: providing a return notification to a shipping device associated with the product identified by the return request.

7. The method of claim 1, wherein accessing the printable shipping label in accordance with the return request comprises: accessing the printable shipping label for dimensions and weight of the product identified by the return request.

8. The method of claim 1, further comprising: at the internet connected server:
   receiving, from the user device via the API, recipient data that identifies the delivery address;
   providing delivery options to the user device via the API;
   receiving, from the user device via the API, information identifying selection of one of the delivery options;
   providing, via the API, a delivery notification to a shipping device used to deliver the product to the delivery address, wherein the delivery notification identifies the selection of the delivery option, and wherein the shipping device is external to the shipping services platform.

9. The method of claim 1, further comprising: at the internet connected server:
   receiving, via the API from a shipping device used to deliver the product to the delivery address, recipient data that identifies the delivery address;
   providing delivery options to the shipping device via the API, wherein the delivery options are determined based on a shipping score;
   receiving, from the shipping device via the API, information identifying selection of one of the delivery options.

10. The method of claim 9, further comprising: at the internet connected server: providing, via the API, a delivery notification to a shipping carrier device associated with the selection of the delivery option.

11. The method of claim 9, further comprising: at the internet connected server: providing, via the API, a delivery notification to the user device.

12. The method of claim 11, wherein the return request includes information identified by the delivery notification provided to the user device.

13. The method of claim 12, wherein the delivery notification provided to the user device includes a shipping services platform tracking link associated with delivery of the product to the delivery address.

14. The method of claim 1, wherein the return method specifies a drop-off location.

15. A method for return shipping comprising: at an internet connected server of a shipping services platform:
- receiving a shipping services platform tracking link from a user device external to the shipping services platform, wherein the server receives the tracking link via a shipping services platform application programming interface (API);
- accessing a printable shipping label for return of a previously delivered product associated with the tracking link;
- providing the printable shipping label to the user device via the API; and
- providing a notification to a shipping carrier associated with the shipping label, wherein the notification is contemporaneously provided to the shipping carrier when the printable shipping label is provided to the user device.

16. The method of claim 15, further comprising: at the internet connected server: providing a return notification to a shipping device associated with the tracking link.

17. The method of claim 16, wherein accessing the printable shipping label comprises: accessing the printable shipping label for dimensions and weight of the product associated with the tracking link.

18. A method for return shipping comprising: at an internet connected server of a shipping services platform:
- receiving, from a user device external to the shipping services platform, a user account identifier and a picture of a previously delivered product, wherein the server receives the user account identifier and the picture via a shipping services platform application programming interface (API), wherein the previously delivered product is a product previously delivered to a delivery address of the user account by using the shipping services platform;
- accessing a printable shipping label for return of the previously delivered product, based on the user account identifier and the picture;
- providing the printable shipping label to the user device via the API; and
- providing a notification to a shipping carrier associated with the shipping label, wherein the notification is contemporaneously provided to the shipping carrier when the printable shipping label is provided to the user device.

19. The method of claim 18, further comprising: at the internet connected server: providing a return notification to a shipping device associated with the previously delivered product.

20. The method of claim 19, wherein accessing the printable shipping label comprises: accessing the printable shipping label for dimensions and weight of the previously delivered product.

* * * * *